(12) United States Patent
Khellah et al.

(10) Patent No.: US 6,784,688 B2
(45) Date of Patent: Aug. 31, 2004

(54) SKEWED REPEATER BUS

(75) Inventors: Muhammad M. Khellah, Lake Oswego, OR (US); James W. Tschanz, Portland, OR (US); Yibin Ye, Portland, OR (US); Vivek K. De, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 10/334,410

(22) Filed: Dec. 30, 2002

(65) Prior Publication Data

US 2004/0124880 A1 Jul. 1, 2004

(51) Int. Cl.$^7$ .......................................... H03K 19/003
(52) U.S. Cl. ........................... 326/21; 326/29; 326/93; 327/403
(58) Field of Search ..................... 326/21, 29, 31, 326/93, 101; 327/403, 261

(56) References Cited

U.S. PATENT DOCUMENTS

| | | | | |
|---|---|---|---|---|
| 5,306,967 A | * | 4/1994 | Dow | 326/101 |
| 5,994,946 A | * | 11/1999 | Zhang | 327/403 |
| 6,154,045 A | | 11/2000 | Ye et al. | |

FOREIGN PATENT DOCUMENTS

JP          02246354 A  *  10/1990  .......... H01L/21/82

OTHER PUBLICATIONS

Khellah, et al.; "Static Pulsed Bus for On–Chip Interconnects"; 2002 Symposium On VLSI Circuits Digest of Technical Papers; 0–7803–7310–3; pp. 78–79.

Anders, et al., "A Transition–Encoded Dynamic Bus Technique for High–Performance Interconnects"; 2002 Symposium on VLSI Circuits Digest of Technical Papers; 0–7803–7310–3; pp. 16–17.

* cited by examiner

*Primary Examiner*—James Hyonchol Cho
(74) *Attorney, Agent, or Firm*—Buckley, Maschoff & Talwalkar LLC

(57) ABSTRACT

According to some embodiments, provided are a first signal line, the first signal line coupled to a first repeater, the first repeater to convert a first signal from a received signal level to an output signal level, the first repeater to convert from a first signal level to a second signal level slower than from the second signal level to the first signal level, and a second signal line adjacent to the first signal line, the second signal line coupled to a second repeater adjacent to the first repeater, the second repeater to convert a second signal from a second received signal level to a second output signal level, the second repeater to convert from the first signal level to the second signal level slower than from the second signal level to the first signal level, wherein the received signal level is substantially equivalent to the second output signal level and wherein the second received signal level is substantially equivalent to the output signal level.

20 Claims, 7 Drawing Sheets

SKEWED REPEATER BUS

BACKGROUND

The performance and power of conventional microprocessors are limited by RC characteristics of long on-chip interconnects. The RC characteristics cause the delay of signals that are transmitted over the interconnects. Of these characteristics, coupling capacitance ($C_c$) between neighboring signal lines contributes approximately 50% of total line capacitance, even in the case of copper lines.

The effective coupling capacitance of a signal line is equal to $C_c$ multiplied by a Coupling Capacitance Multiplier (CCM). The CCM for a particular signal line is dependent upon the relative directions of signal transitions within the particular signal line and within a neighboring line. If the particular signal line carries a signal transition from a first signal level to a second signal level, CCM for the signal line is 1 if the neighboring line does not carry a signal transition, 0 if the neighboring line carries a signal transition from the first signal level to the second signal level, and 2 if the neighboring line carries a signal transition from the second signal level to the first signal level.

FIG. 1 illustrates a conventional static bus architecture for the purpose of explaining capacitive effects that result from adjacent signal transitions on neighboring signal lines. Bus 1 includes signal paths 10, 20 and 30. Signal path 10 comprises driver flip-flop 11, receiver flip-flop 12 and repeaters 13 through 16 connected serially therebetween. Repeaters 13 through 16 are intended to reduce signal delays caused by path 10 by creating a linear relationship between the length of signal path 10 and the signal delay associated therewith. Moreover, repeaters 13 through 16 are inverters that convert a received signal of a first signal level to an output signal of a second signal level. Signal paths 20 and 30 are constructed similarly to signal path 10.

FIG. 2 is a timing diagram illustrating signals on signal paths 10, 20 and 30 of bus 1. The diagram assumes that the bit values "1", "0" and "1" are to be transmitted over signal paths 10, 20 and 30, respectively. As shown, each of these values initially undergoes a transition between time $t_1$ and $t_2$ due to a respective one of repeaters 13, 23 and 33. In particular, repeater 23 converts the signal on path 20 from a low signal level to a high signal level and repeaters 13 and 33 convert the signals on paths 10 and 30 from a high signal level to a low signal level. Accordingly, CCM of signal path 20 relative to signal path 10 is 2, and relative to signal path 30 is also 2. In addition, transitions occurring between times $t_3$ and $t_4$, $t_5$ and $t_6$, and $t_7$ and $t_8$ each result in a CCM of 2 for signal path 20 relative to signal path 10, and a CCM of 2 for signal path 20 relative to signal path 30. The resulting impact on worst-case delay, energy and peak supply current often renders the architecture of bus 1 unsuitable.

The delay of a bus can be improved by avoiding the worst-case situation of a CCM equal to 2. One approach uses a dynamic bus, in which bus segments pre-charge during one clock phase and conditionally evaluate in the next phase. Such a dynamic bus provides a worst-case CCM of 1 because all bus segments pre-charge and evaluate in a same direction. However, dynamic buses require additional clock routing and suffer from increased switching activity relative to static buses. Another approach uses a pulse generator to send a pulse along a static bus for each input data transition. This latter approach requires additional overhead of a pulse generator and a decoder to decode the pulses.

DETAILED DESCRIPTION

In the following description, particular types of circuits and circuit elements are described for purposes of illustration. Other embodiments, however, are applicable to other types of circuits. Further, although complementary metal-oxide semiconductor (CMOS) gates are referred to in the illustrations that follow, it will be appreciated by those of ordinary skill in the art that some embodiments may be implemented using various other types of processing technologies.

Figure 1:
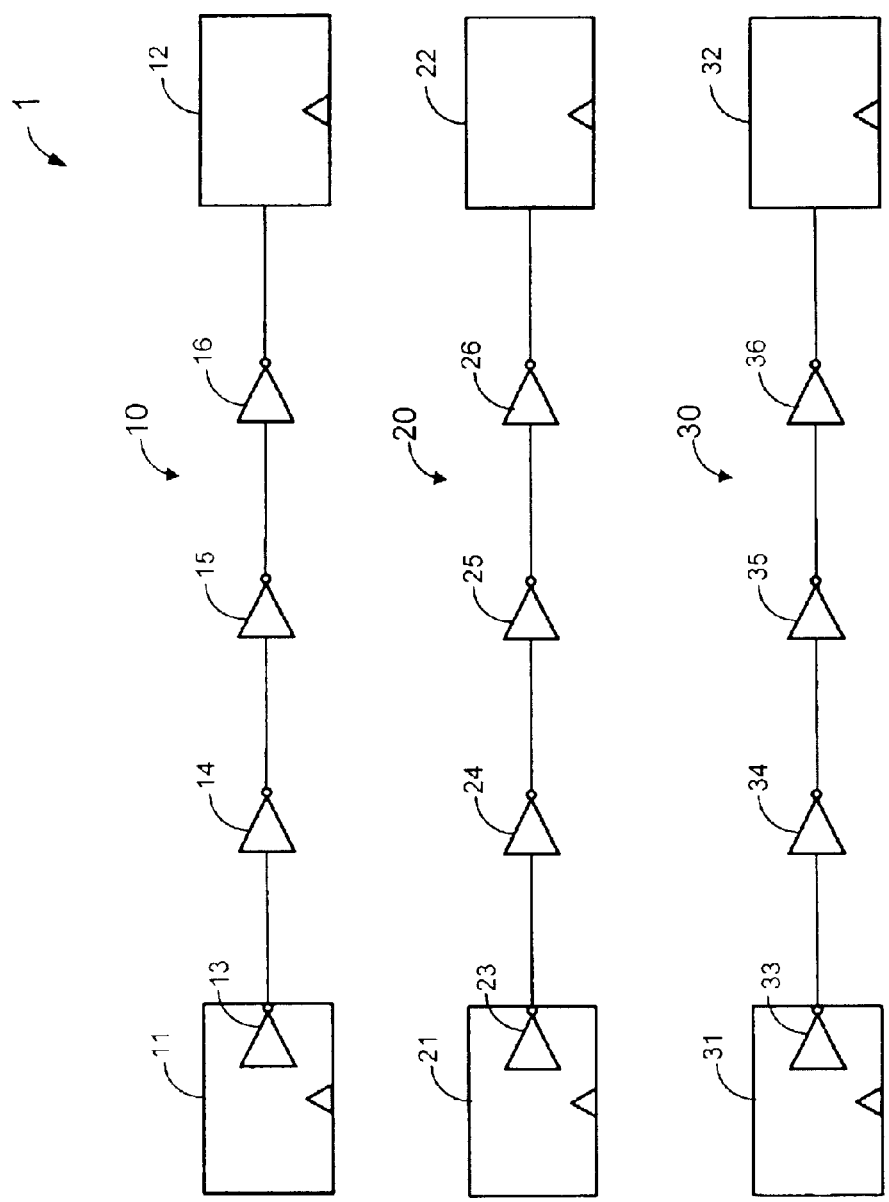
FIG. 1 is a logical diagram of a conventional bus.
Figure 2:
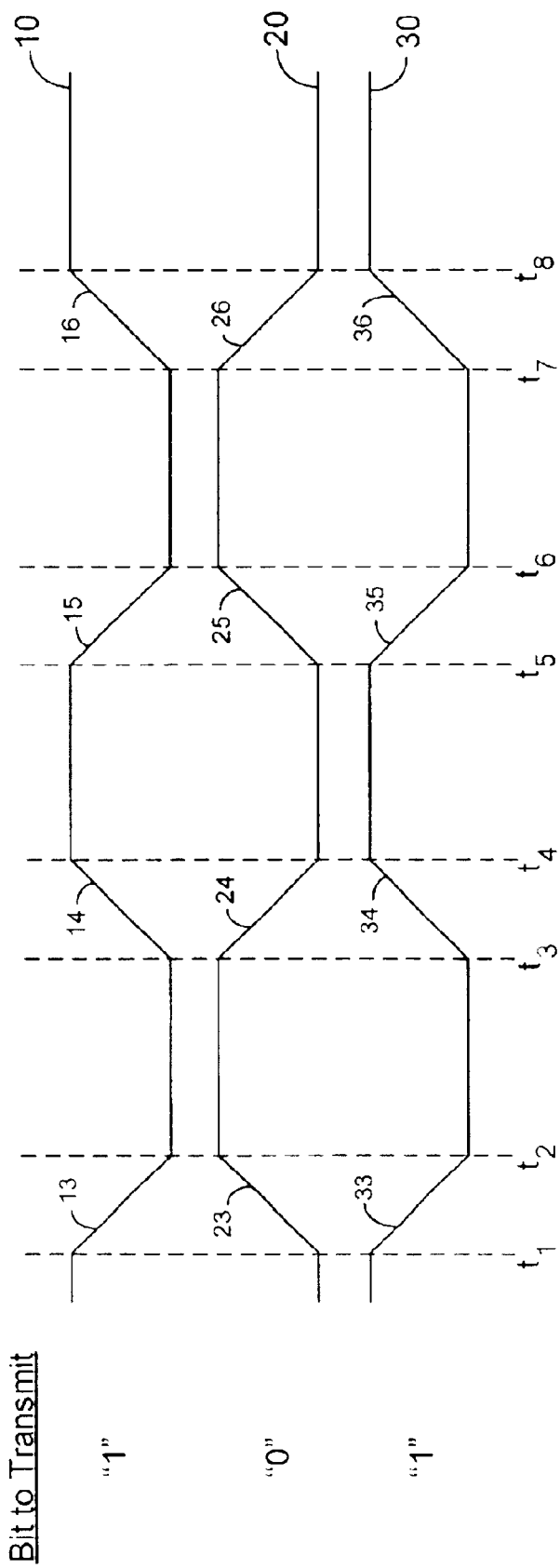
FIG. 2 is a timing diagram of signals on a conventional bus.
Figure 3:
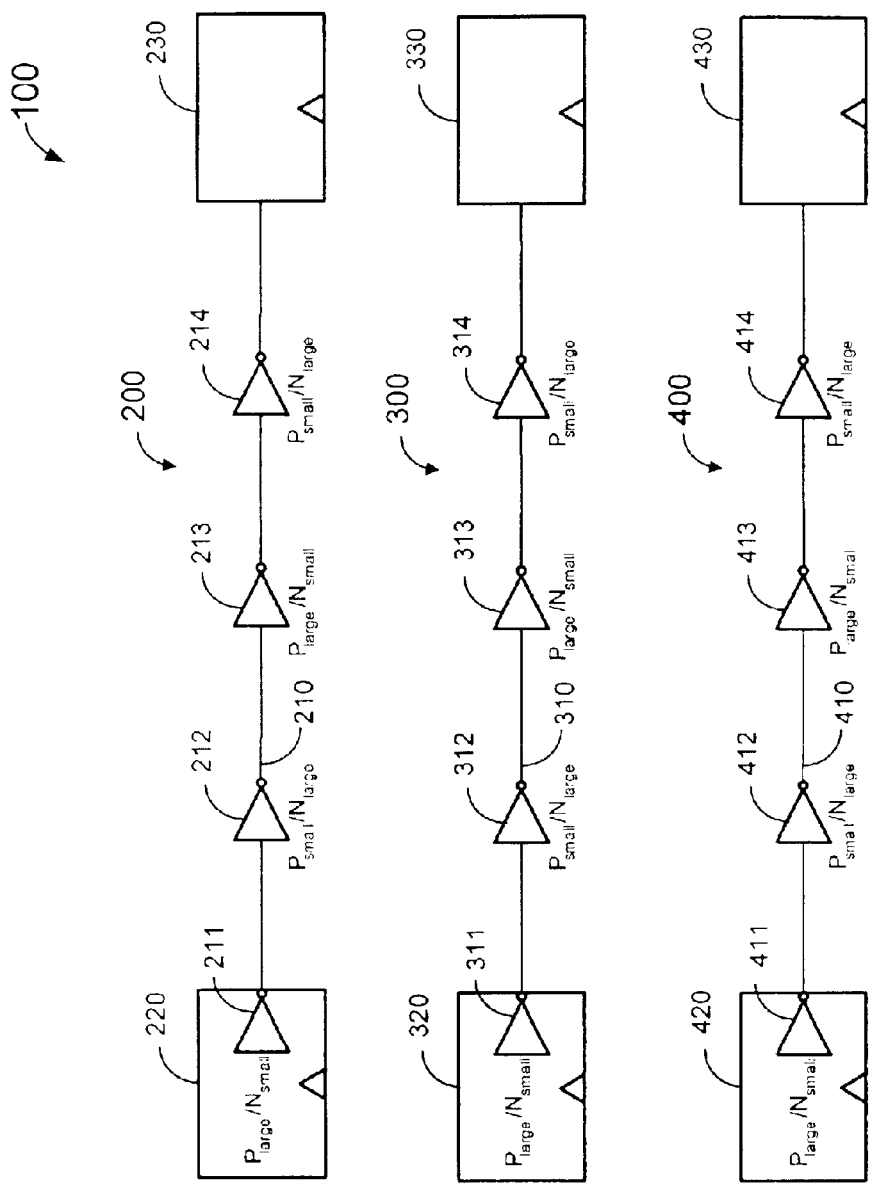
FIG. 3 is a logical diagram of a bus according to some embodiments.

FIG. 3 is a logical diagram of bus 100 according to some embodiments. Bus 100 is a circuit comprising signal paths 200, 300 and 400. Signal path 300 includes signal line 310 coupled to repeaters 311 through 314, driver 320 and receiver 330. Bus 100 may be an element of an interconnect between non-adjacent blocks and/or an element of a logic block.

According to some embodiments, repeater 311 is skewed to convert a signal from a low signal level to a high signal level faster than from a high signal level to a low signal level. To indicate this characteristic, repeater 311 is identified with the notation $P_{large}/N_{small}$. Conversely, serially-connected repeater 312 is skewed to convert a signal from a high signal level to a low signal level faster than from a low signal level to a high signal level. Repeater 312 is therefore identified with the notation $P_{small}/N_{large}$. This notation convention also applies to repeaters 313 and 314. As a result, a signal transmitted by driver 320 that has an initially-low signal level travels to receiver 330 faster than a signal that has an initially-high signal level. This phenomenon will be described in more detail below.

Signal paths 200 and 400 share a similar construction with signal path 300. Moreover, repeaters of signal paths 200 and 400 are adjacent to repeaters of signal path 300 with which they are vertically aligned. For example, repeaters 211 and 411 are adjacent to repeater 311. In some embodiments, repeaters 211 and 411 are substantially a same distance from drivers 220 and 420, respectively, as repeater 311 is from driver 320.

The repeaters of FIG. 3 comprise inverters. In a standard static CMOS inverter, the sizes of p-channel metal-oxide semiconductor (PMOS) devices and n-channel metal-oxide semiconductor (NMOS) devices included therein are typically designed such that the rise time of a signal provided at the inverter output is approximately the same as the fall time of a signal provided at the inverter output. However, as described above, the repeaters of FIG. 3 convert signals from a first signal level to a second signal level slower than they convert signals from the first signal level to the second signal level.

Figure 4B:
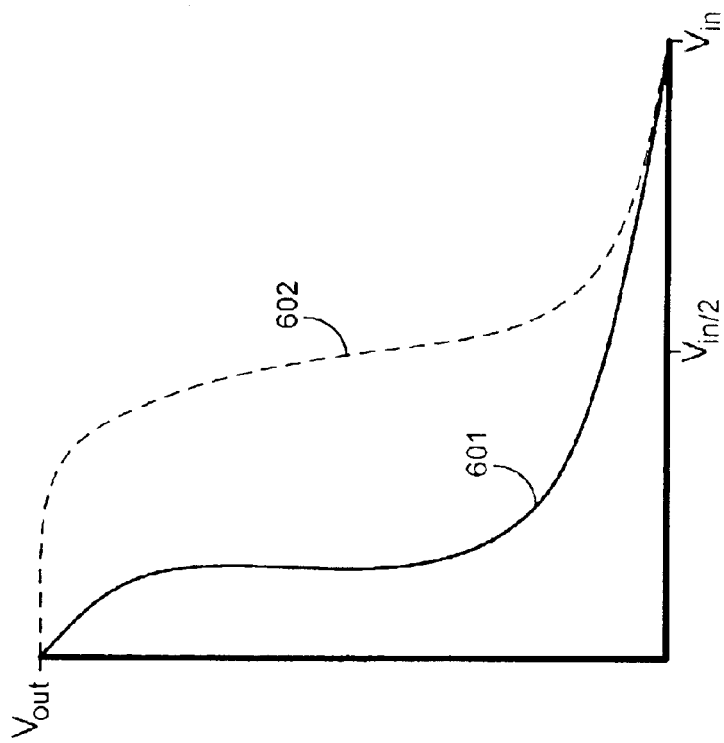
FIG. 4b illustrates a transfer characteristic of a repeater according to some embodiments.
Figure 4A:
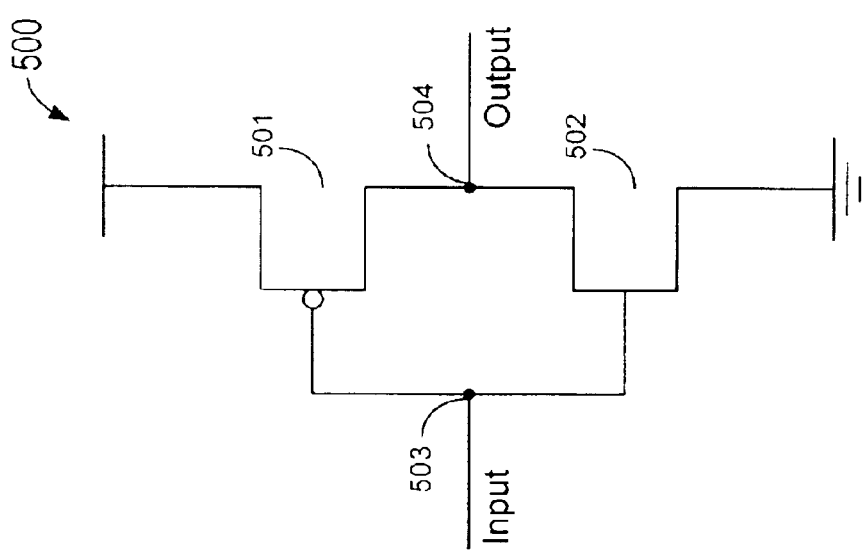
FIG. 4a is a schematic diagram of a repeater according to some embodiments.

FIG. 4a is a schematic diagram of inverter 500 that is skewed to convert from a high signal level to a low signal level faster than from a low signal level to a high signal level in accordance with some embodiments. Accordingly, inverter 500 may be used as repeater 312 of signal path 300. Inverter 500 includes PMOS transistor 501 and NMOS transistor 502. As shown, a gate of transistor 502 is coupled to a gate of transistor 501 at input node 503, a source of transistor 501 is coupled to a supply voltage, a drain of transistor 501 is coupled to a drain of transistor 502 at output node 504, and a source of transistor 501 is coupled to ground.

NMOS transistor 502 of inverter 500 is stronger than PMOS transistor 501. As a result, a signal at output node 504 transitions from a high signal level to a low signal level more quickly than an inverter that includes transistors of equal strength. The faster transition of the output signal is primarily due to earlier triggering of the falling transition as a result of a lower input inversion voltage of the stronger n-type gate, and the smaller capacitive load per micrometer of driving transistor 502.

FIG. 4b illustrates transfer characteristic 601 of a repeater, such as inverter 500, according to some embodiments. For comparison purposes, FIG. 4b also illustrates transfer characteristic 602 of a similar gate that is "balanced", or not skewed toward any particular transition. As shown, inverter 500 exhibits a faster high-to-low output signal transition than a balanced gate but also exhibits a slower low-to-high output signal transition than a balanced gate.

Figure 5B:
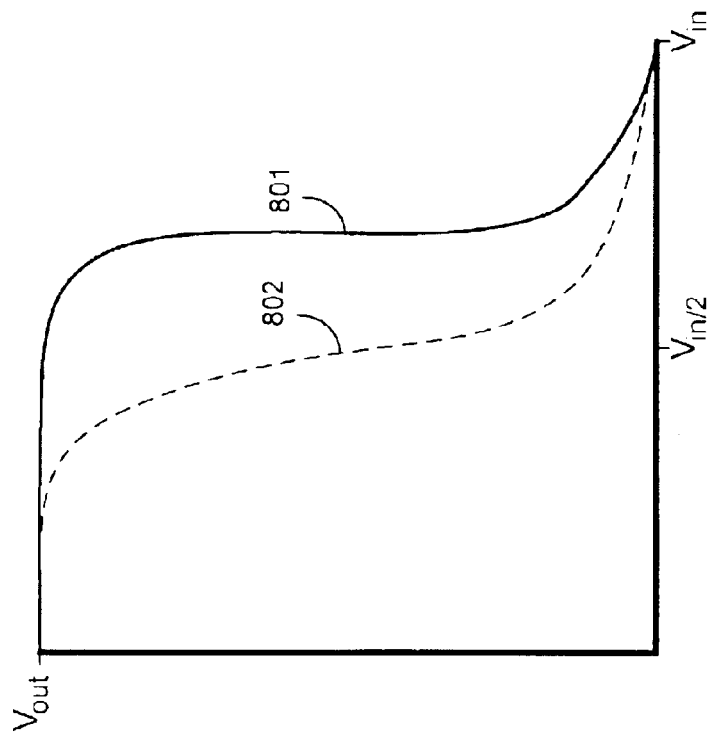
FIG. 5b illustrates a transfer characteristic of a repeater according to some embodiments.
Figure 5A:
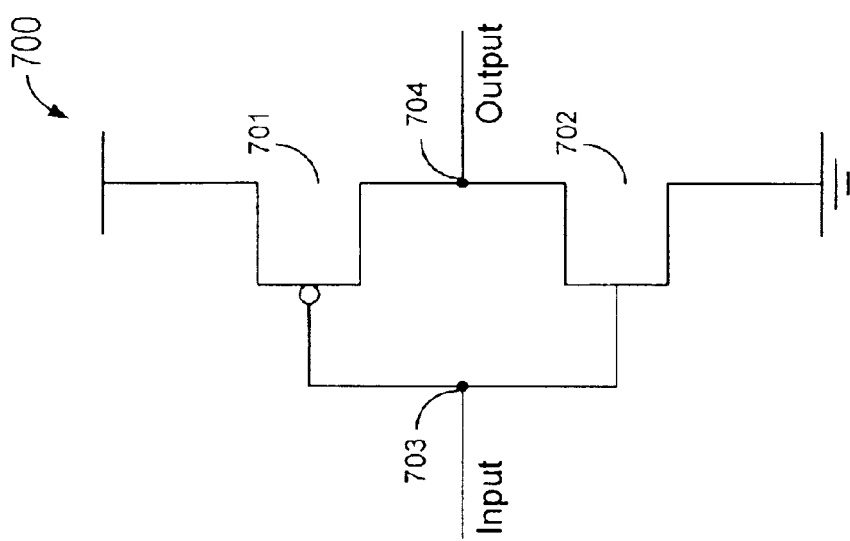
FIG. 5a is a schematic diagram of a repeater according to some embodiments.

FIG. 5a is a schematic diagram of inverter 700 that is skewed to convert from a low signal level to a high signal level faster than from a high signal level to a low signal level in accordance with some embodiments. Accordingly, inverter 700 may be used as repeater 311 of signal path 300. Like inverter 500, inverter 700 includes PMOS transistor 701 and NMOS transistor 702. A gate of transistor 702 is coupled to a gate of transistor 701 at input node 703, a source of transistor 701 is coupled to a supply voltage, a drain of transistor 701 is coupled to a drain of transistor 702 at output node 704, and a source of transistor 701 is coupled to ground.

In contrast to inverter 500, PMOS transistor 701 is stronger than NMOS transistor 702. A signal at output node 704 therefore transitions from a low signal level to a high signal level more quickly than a balanced inverter. Again, the faster transition of the output signal is primarily due to earlier triggering of the rising transition as a result of a lower input inversion voltage of the stronger p-type gate, and the smaller capacitive load per micrometer of driving transistor 701.

FIG. 5b is a graph showing transfer characteristic 801 of an inverter, such as inverter 700, that is skewed to favor a low-to-high transition. Comparing transfer characteristic 801 with transfer characteristic 802 of a balanced inverter, it will be noted that while inverter 700 provides a faster low-to-high signal transition at its output, inverter 700 provides a slower high-to-low signal transition at its output than the balanced inverter.

Figure 6:
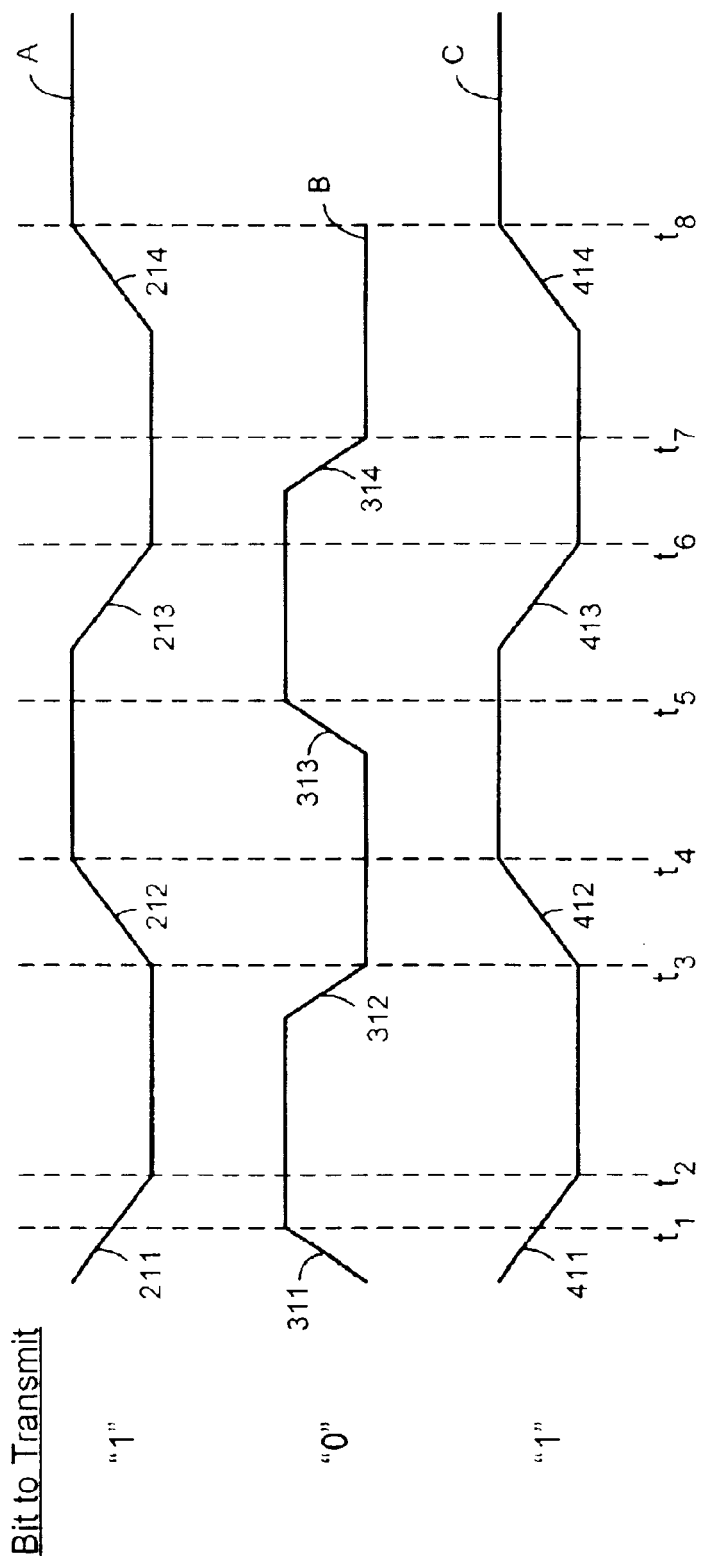
FIG. 6 is a timing diagram of signals on a bus according to some embodiments.

FIG. 6 illustrates signals on signal paths 200 through 400 according to some embodiments. In particular, signal A is carried by signal path 200, signal B is carried by signal path 300, and signal C is carried by signal path 400. Signals A and C represent a signal level of "1" initially transmitted by drivers 220 and 420, respectively, while signal B represents a signal level of "0" initially transmitted by driver 320. Each signal originates from its respective driver at substantially the same time.

As shown, each of signals A, B and C is initially converted from a first signal level to a second signal level by one of repeaters 211, 311 and 411. Repeaters 211, 311 and 411 are skewed to convert a signal from a low signal level to a high signal level faster than they convert a signal from the high signal level to the low signal level. Accordingly, the conversion of signals A and C from a received high signal level to an output low signal level proceeds more slowly than the conversion of signal B from a received low signal level to an output high signal level. A difference in the respective conversion times is depicted in FIG. 6 as $t_2-t_1$.

Because repeater 311 generates an output signal prior to repeaters 211 and 411, signal B arrives at repeater 312 before signals A and C arrive at repeaters 212 and 412. As shown in FIG. 6, repeater 312 completes a conversion of the received high signal level to a low output signal level by time $t_3$. In this regard, repeater 312 may be implemented by an inverter such as inverter 500, which is skewed to convert from a high signal level to a low signal level faster than from a low signal level to a high signal level.

Signals A and C reach repeaters 212 and 412 at time $t_3$, and are converted from a low signal level to a high signal level during a time period between $t_3$ and $t_4$. Since repeaters 212 and 412 are skewed to convert from a high signal level to a low signal level faster than from a low signal level to a high signal level, the delay between signal B and signals A and C has increased from $(t_2-t_1)$ to $(t_4-t_3)$.

As shown in FIG. 6, a signal level conversion occurring at repeater 312 does not overlap in time with signal level conversions occurring at adjacent repeaters 212 and 412. As a result, a CCM associated with signal path 300 and signal path 200 at repeaters 312 and 212 is 1, and a CCM associated with signal path 300 and signal path 400 at repeaters 312 and 412 is also 1.

A next signal level conversion occurring at repeater 313 also does not overlap in time with signal conversions occurring at adjacent repeaters 213 and 413. Moreover, a delay of signals A and C relative to signal B further increases to $(t_6-t_5)$ at the outputs of repeaters 213 and 413 because repeaters 213, 313 and 413 are skewed to favor a low-to-high signal level transition (provided by repeater 313) at the expense of a high-to-low signal transition (provided by repeaters 213 and 413).

The last signal level transition occurs at repeaters 214, 314 and 414. Again, the conversion at repeater 314 does not overlap in time with the conversions at adjacent repeaters 214 and 414, resulting in a CCM value of 1 between signal paths 300 and 200 as well as between signal paths 300 and 400.

Signals A and C arrive at their respective receivers after signal B arrives at receiver 330. This delay may be outweighed by the speed advantage gained by reducing the worst-case CCM to 1 with respect to some repeaters of signal paths 200, 300 and 400. Some embodiments such as bus 100 use repeaters in a signal path that are designed to minimize an amount of transition overlap between adjacent repeaters. In some embodiments, less than all of the repeaters of a signal path are alternately-skewed, with the remainder of the repeaters being balanced so as to maintain a signal separation established by the alternately-skewed repeaters.

Accordingly, some embodiments provide improved delay, power, and peak current characteristics. Some embodiments avoid encoders and decoders, and some embodiments allow simple design and low power consumption.

Figure 7:
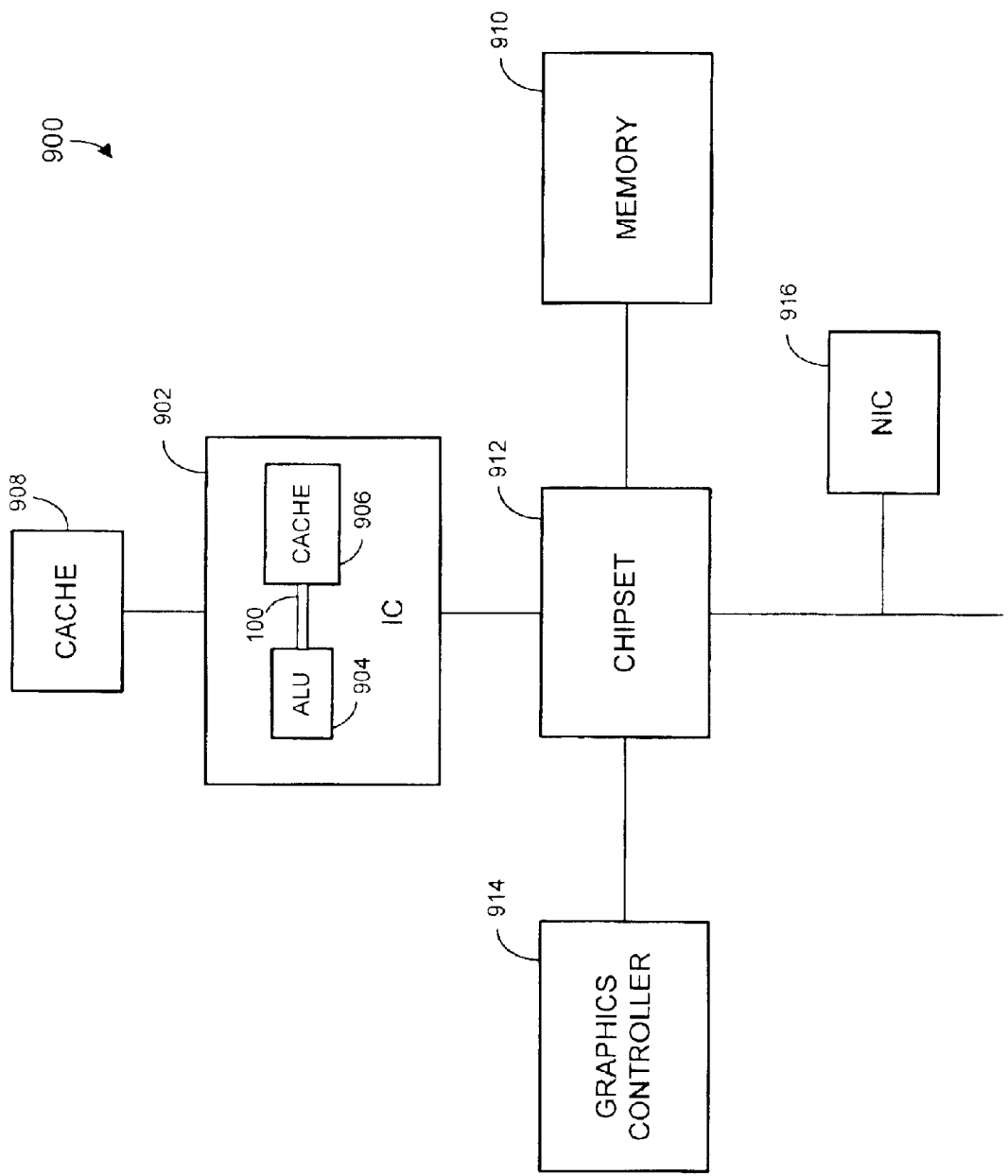
FIG. 7 is a block diagram of a system according to some embodiments.

FIG. 7 illustrates a block diagram of system 900 according to some embodiments. System 900 includes integrated circuit 902 which may be a microprocessor or another type of integrated circuit. Integrated circuit 902 comprises sub-blocks such as arithmetic logic unit (ALU) 904 and on-die cache 906, which communicate with one another via bus 100 of FIG. 3. According to some embodiments, integrated circuit 902 communicates with off-die cache 908. Integrated circuit 902 may also communicate with system memory 910 via a host bus and chipset 912. Communication between integrated circuit 902 and off-die cache 908 and/or chipset 912 may proceed over a bus such as bus 100. Other off-die functional units, such as graphics controller 914 and Network Interface Controller (NIC) 916, may communicate with integrated circuit 902 via appropriate busses or ports.

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

What is claimed is:

1. A circuit comprising:
    a first signal line, the first signal line coupled to a first repeater, the first repeater to convert a first signal from a received signal level to an output signal level, the first repeater to convert from a first signal level to a second signal level slower than from the second signal level to the first signal level; and
    a second signal line adjacent to the first signal line, the second signal line coupled to a second repeater adjacent to the first repeater, the second repeater to convert a second signal from a second received signal level to a second output signal level, the second repeater to convert from the first signal level to the second signal level slower than from the second signal level to the first signal level,
    wherein the received signal level is substantially equivalent to the second output signal level and wherein the second received signal level is substantially equivalent to the output signal level.

2. A circuit according to claim 1, wherein the first repeater comprises an inverter and the second repeater comprises an inverter.

3. A circuit according to claim 2, wherein the first repeater comprises an NMOS transistor and a PMOS transistor, a gate of the NMOS transistor coupled to a gate of the PMOS transistor at an input node, a source of the PMOS transistor coupled to a supply voltage, a drain of the PMOS transistor coupled to a drain of the NMOS transistor at an output node, and a source of the NMOS transistor coupled to ground.

4. A circuit according to claim 3, wherein the NMOS transistor is stronger than the PMOS transistor.

5. A circuit according to claim 3, wherein the PMOS transistor is stronger than the NMOS transistor.

6. A circuit according to claim 1, wherein the first signal line further comprises a third repeater serially-connected to the first repeater, the third repeater to convert the first signal from a third received signal level to a third output signal level, the third repeater to convert from the first signal level to the second signal level faster than from the second signal level to the first signal level,
    wherein the second signal line further comprises a fourth repeater adjacent to the third repeater and serially-connected to the second repeater, the fourth repeater to convert the second signal from a fourth received signal level to a fourth output signal level, the fourth repeater to convert from the first signal level to the second signal level faster than from the second signal level to the first signal level, and
    wherein the third received signal level is substantially equivalent to the fourth output signal level and wherein the fourth received signal level is substantially equivalent to the third output signal level.

7. A circuit according to claim 1, further comprising:
    a first driver coupled to the first signal line, wherein the first driver comprises the first repeater; and
    a second driver coupled to the second signal line, wherein the second driver comprises the second repeater.

8. A circuit according to claim 1, further comprising:
    a third signal line adjacent to the first signal line, the third signal line coupled to a third repeater adjacent to the first repeater, the third repeater to convert a third signal from a third received signal level to a third output signal level, the third repeater to convert from the first signal level to the second signal level slower than from the second signal level to the first signal level.

9. A circuit according to claim 1, wherein the first repeater is to convert the first signal during a first time period, and
    wherein the second repeater is to convert the second signal during a second time period, and
    wherein the first time period and the second time period do not overlap.

10. A bus comprising:
    a plurality of signal lines coupled to a plurality of respective drivers, each of the signal lines comprising a respective repeater to convert a respective signal from a received signal level to an output signal level, the repeater to convert from a first signal level to a second signal level slower than from the second signal level to the first signal level,
    wherein a first signal line and a second signal line of the plurality of signal lines are adjacent to one another,
    wherein a repeater of the first signal line is substantially a same distance from a driver of the first signal line as a repeater of the second signal line is from a driver of the second signal line,
    wherein the repeater of the first signal line is to convert a first signal transmitted at a particular time by the driver of the first signal line from the first signal level to the second signal level, and
    wherein the repeater of the second signal line is to convert a second signal transmitted at the particular time by the driver of the second signal line from the second signal level to the first signal level.

11. A bus according to claim 10, wherein the repeater of the first signal line comprises an inverter and the repeater of the second signal line comprises an inverter.

12. A bus according to claim 11, wherein the repeater of the first signal line comprises an NMOS transistor and a PMOS transistor, a gate of the NMOS transistor coupled to a gate of the PMOS transistor at an input node, a source of the PMOS transistor coupled to a supply voltage, a drain of the PMOS transistor coupled to a drain of the NMOS transistor at an output node, and a source of the NMOS transistor coupled to ground.

13. A bus according to claim 12, wherein the NMOS transistor is stronger than the PMOS transistor.

14. A bus according to claim 12, wherein the PMOS transistor is stronger than the NMOS transistor.

15. A bus according to claim 10, wherein a third signal line of the plurality of signal lines is adjacent to the second signal line, and wherein a repeater of the third signal line is substantially a same distance from a driver of the third signal line as the repeater of the second signal line is from the driver of the second signal line.

16. A bus according to claim 10, wherein each of the signal lines comprises a second repeater to convert a respective signal from a received signal level to an output signal level, the second repeater to convert from the second signal level to the first signal level slower than from the first signal level to the second signal level, wherein a second repeater of the first signal line is substantially a same distance from the driver of the first signal line as a second repeater of the second signal line is from the driver of the second signal line.

17. A bus according to claim 10, wherein the repeater of the first signal line is to convert the first signal during a first time period, and wherein the repeater of the second signal line is to convert the second signal during a second time period, and wherein the first time period and the second time period do not overlap.

18. A system comprising:

a chipset;

a die comprising a microprocessor in communication with the chipset; and a bus to couple the chipset and the die, wherein the bus comprises:
  a first signal line, the first signal line coupled to a first repeater, the first repeater to convert a first signal from a received signal level to an output signal level, the first repeater to convert from a first signal level to a second signal level slower than from the second signal level to the first signal level; and
  a second signal line adjacent to the first signal line, the second signal line coupled to a second repeater adjacent to the first repeater, the second repeater to convert a second signal from a second received signal level to a second output signal level, the second repeater to convert from the first signal level to the second signal level slower than from the second signal level to the first signal level, wherein the received signal level is substantially equivalent to the second output signal level and wherein the second received signal level is substantially equivalent to the output signal level.

19. A system according to claim 18, wherein the first signal line further comprises a third repeater serially-connected to the first repeater, the third repeater to convert the first signal from a received signal level to an output signal level, the third repeater to convert from the first signal level to the second signal level faster than from the second signal level to the first signal level, and wherein the second signal line further comprises a fourth repeater adjacent to the third repeater and serially-connected to the second repeater, the fourth repeater to convert the second signal from a received signal level to an output signal level, the fourth repeater to convert from the first signal level to the second signal level faster than from the second signal level to the first signal level.

20. A system according to claim 18, the bus further comprising:

a third signal line adjacent to the first signal line, the third signal line coupled to a third repeater adjacent to the first repeater, the third repeater to convert a third signal from a third received signal level to a third output signal level, the third repeater to convert from the first signal level to the second signal level slower than from the second signal level to the first signal level.

* * * * *